United States Patent [19]

Van Siclen, Jr.

[11] 4,445,490

[45] May 1, 1984

[54] IGNITION SYSTEM FOR AN INTERNAL COMBUSTION ENGINE

[75] Inventor: Howard E. Van Siclen, Jr., Unadilla, N.Y.

[73] Assignee: The Bendix Corporation, Southfield, Mich.

[21] Appl. No.: 341,031

[22] Filed: Jan. 20, 1982

[51] Int. Cl.³ .............................................. F02P 5/00
[52] U.S. Cl. .................................... 123/602; 123/618; 307/597
[58] Field of Search ................... 123/599, 602, 618; 307/597, 603, 605, 296 R, 263, 228

[56] References Cited

U.S. PATENT DOCUMENTS

| | | |
|---|---|---|
| 3,189,751 | 6/1965 | Winchel ............................... 307/597 |
| 3,240,198 | 3/1966 | Loudon et al. . |
| 3,252,024 | 5/1966 | Loudon . |
| 3,742,257 | 6/1973 | Wittenzellner ...................... 307/603 |
| 3,952,715 | 4/1976 | Van Siclen, Jr. .................... 123/602 |
| 4,335,692 | 6/1982 | Miura .................................. 123/602 |

FOREIGN PATENT DOCUMENTS 3001447  8/1980  Fed. Rep. of Germany ...... 123/602

*Primary Examiner*—Parshotam S. Lall
*Attorney, Agent, or Firm*—Raymond J. Eifler; Charles D. Lacina

[57] ABSTRACT

This invention provides a circuit for automatically advancing the timing of an ignition system independent of engine speed. The invention is characterized by timing circuit (100) which initiates a timing change in reponse to a computer output signal (60) by operating a transistor (125) in its active region as a resistor.

6 Claims, 2 Drawing Figures

IGNITION SYSTEM FOR AN INTERNAL COMBUSTION ENGINE

This invention relates to an ignition system for an internal combustion engine and more specifically to a timing circuit within the ignition system that changes the time in the operating cycle of the engine that electrical energy is supplied to a spark plug.

An ignition system for an internal combustion engine generates timing pulses, which indicate the instant during the piston stroke that the spark plug should be fired, and distributes these pulses to the individual spark plugs to cause them to fire in a preset order. One example of an ignition system that advances the timing of an ignition system upon an increase in engine speed may be found in U.S. Pat. No. 3,240,198 issued Mar. 15, 1966 and entitled "Electrical Apparatus". An electromagnetic pulse generator used with such a system may be found in U.S. Pat. No. 3,252,024, issued May 17, 1966 and entitled "Electrical Apparatus". An improvement to such an ignition system may be found in U.S. Pat. No. 3,952,715 issued Apr. 27, 1976 and entitled "Variable and Constant Timing for Breakerless Ignition". This last patent discloses a pulse generating system for controlling spark timing in which timing is advanced with increased engine speed and changed independently of engine speed by a voltage biasing means. The triggering circuit in the system may be controlled manually by varying a resistor or controlled by a computer to provide any desired spark timing. Not disclosed in the U.S. Pat. No. 3,952,715 patent is a circuit that interfaces with a computer for automatically controlling the timing. When a computer is utilized to analyze the operation of an engine it provides an output signal such as a variable current. However, such an output current may not operate a transistor in its active region over its entire output range and, hence, not achieve maximum performance for an engine.

DISCLOSURE OF THE INVENTION

This invention provides a circuit for automatically advancing the timing of an ignition system independent of engine speed. The invention is characterized by a timing circuit which initiates a timing change in response to a computer output signal by operating a transistor in its active region as a resistor. The transistor is in parallel with a capacitor that is in series with and biases the gate of an SCR switch that controls the discharge of energy from a main storage capacitor through a spark plug in response to trigger pulses timed to the engine operating cycle. The resistance of the transistor, operating in its active region, decreases with increasing input current to advance the timing of the system. As the resistance of the transistor decreases, the capacitor, biasing the SCR switch, discharges to a lower voltage level permitting trigger pulses to pass through to trigger ON the SCR switch at a lower level. The predetermined current at which the advance begins is determined by a diode in series with the base of the transistor. The diode does not conduct until the voltage across a resistor reaches a predetermined voltage which corresponds to specific current from the computer.

DETAILED DESCRIPTION OF THE INVENTION

Figure 1:
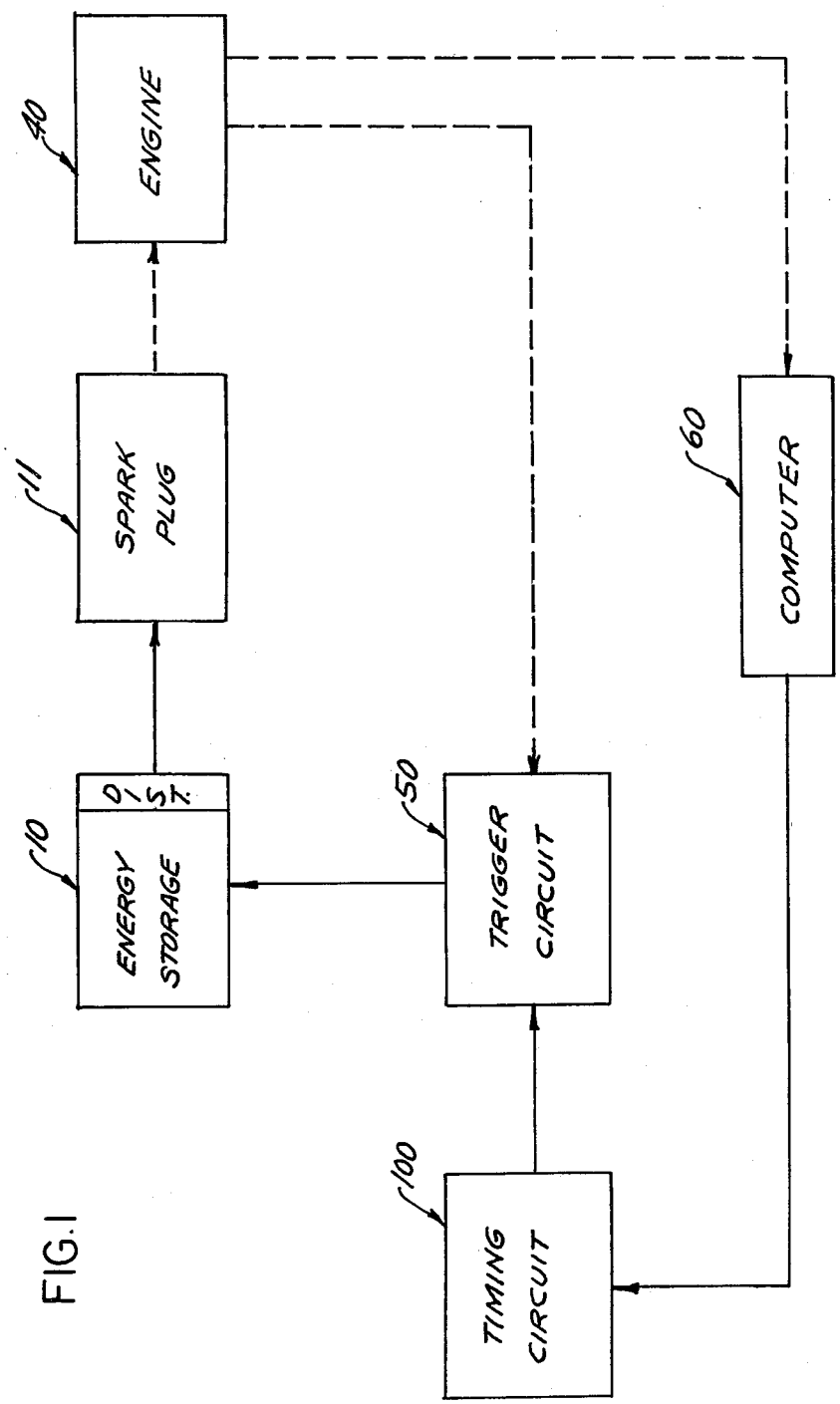
FIG. 1 is a block diagram of the ignition system shown in FIG. 2.

Referring now to the drawings, FIG. 1 illustrates a block diagram of an ignition system that includes an energy storage section 10; a spark plug 11 for receiving the stored energy and for igniting fuel in an internal combustion engine 40; a trigger circuit 50 for generating trigger pulses and suppling them to the energy storage section 10 to release the electrical energy into the spark plug 11 in timed relation to the operating cycle of the engine 40; and a timing circuit 100 for advancing the time that the trigger circuit releases the electrical energy from the storage section 10 to the spark plug 11. Where there is more than one spark plug the energy storage section 10 includes a distributor to distribute the energy release to each spark plug 11 in the proper sequence in the operating cycle of the engine 40.

Figure 2:
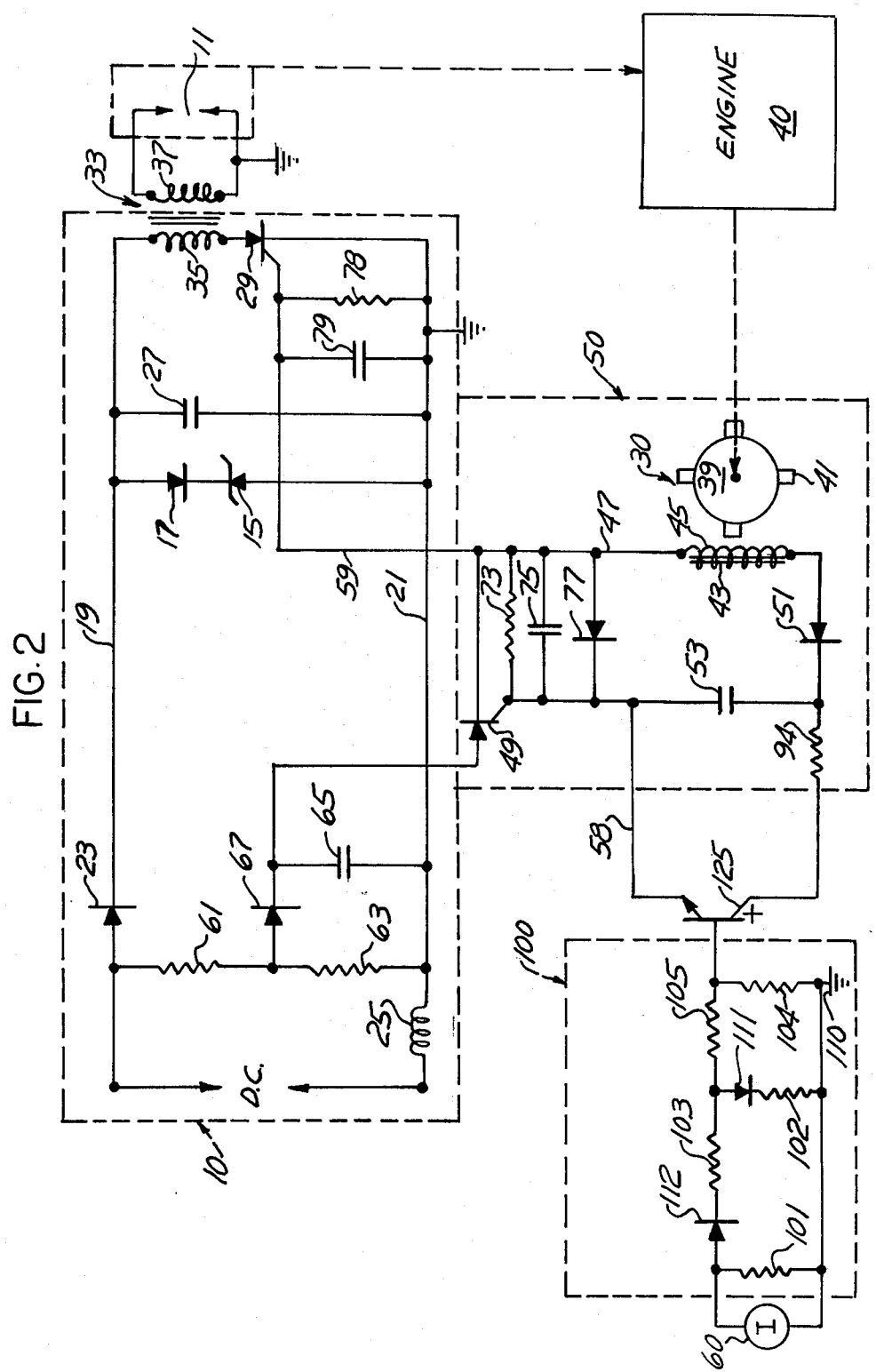
FIG. 2 is a schematic diagram of an ignition system embodying the principles of this invention.

FIG. 2 illustrates an ignition system constructed according to the invention for supplying timed spark discharges from spark plug 11 to an internal combustion engine 40. Any number of spark plugs 11 may be used and electrical energy may be distributed to the spark plugs in timed relation to the engine through a distributor (not shown) as described in U.S. Pat. No. 3,240,198.

Direct current power 13 for the system may be supplied by a magneto or generator through a full wave rectifier or any other suitable source such as a battery. The voltage may also be regulated by Zener diode 15 and diode 17 connected in series across leads 19 and 21. Lead 19 is connected to source 13 through a diode 23 and lead 21 is connected to source 13 through an inductor 25. A main storage capacitor 27 connected between leads 19 and 21 is periodically charged by DC source 13 through diode 23 and inductor 25. Capacitor 27 discharges when a silicon controlled rectifier 29 is triggered to conduct by a triggering pulse from trigger circuit 50. The capacitor 27 upon discharging will provide sufficient energy through transformer 33, which has a primary winding 35 connected in series with silicon controlled rectifier 29 across leads 19 and 21 and a secondary winding 37 connected in series with spark plug 11, to provide a suitable spark at spark plug 11.

An electromagnetic pulse generator, similar to that shown in U.S. Pat. No. 3,252,024 is shown generally as 30. The generator includes a trigger wheel 39 having a plurality of projections or vanes 41 equal to the number of spark plugs 11 and is rotated by the crankshaft of engine 40. The vanes 41 of trigger wheel 39, when rotated, pass through the flux of a permanent magnet 43, having a pickup coil 45 wound thereon. Each time a vane 41 passes through the flux of the permanent magnet a pulse is generated in pickup coil 45. The amplitude of each pulse increases with an increase in the speed of trigger wheel 39. One end of coil 45 is connected through a lead 47 to the cathode of a silicon controlled rectifier 49. The other end of coil 45 is connected through a diode 51 and capacitor 53, to the gate of SCR 49 by a lead 57. Capacitor 53 is the means for supplying a voltage bias in the gate of SCR 49. The novel timing circuit 100 of the invention is connected in parallel with capacitor 53 to control the voltage to which capacitor 53 discharges to between trigger pulses and hence control the bias on the gate of SCR 49. The cathode of SCR 49 is also connected to the gate of SCR 29 through a lead 59. A diode 77 is connected across leads 47 and 57 to keep the reverse gate to cathode voltage at a low value.

A voltage divider including resistors 61 and 63, is connected across leads 19, 21. A capacitor 65 is connected to lead 21 through a diode 67 to the junction of resistor 61 and 63. The capacitor 65 is also connected to the anode SCR 49. Each time a trigger pulse is generated in pickup coil 45, SCR 49 is turned on discharging capacitor 65 through SCR 49, and the gate of SCR 29 to fire spark plug 11.

Radio frequency suppression may be provided for SCR 49 by a resistor 73 and a capacitor 75 connected in parallel between leads 47 and 57 across the gate to cathode circuit of the SCR 49. Similarly, RF suppression may be provided for SCR 29 by a resistor 78 and a capacitor 79 connected in parallel between leads 59 and 29 across the gate to cathode circuit of SCR 29.

The ignition circuit operates as follows: capacitor 65 and 27 are fully charged by DC source 13 between successive pulses generated in pickup coil 45. When the gate of SCR 49 reaches its threshold voltage in response to a pulse from pickup coil 45, the SCR 49 conducts and capacitor 65 discharges through the SCR 49 to provide a pulse through the gate of SCR 29 so that it conducts and discharges capacitor 27 through the primary winding 35 of transformer 33. This induces a high voltage at secondary winding 37 causing a spark discharge across the gap of spark plug 11. The timing of the spark discharge in the engine cycle is determined by the amplitude of the trigger pulse from the electromagnetic pulse generating means 30 and the voltage on capacitor 53 at the time the trigger pulse is generated. In the present embodiment the voltage on capacitor 53 is determined by the amplitude of the trigger pulse and by the value of the resistance of transistor 125 of timing circuit 100. A trigger pulse upon gating SCR 49 charges capacitor 53 to a voltage corresponding to the amplitude of the trigger pulse and, in the interval between trigger pulses, the capacitor 53 discharges through timing circuit 100 to a voltage determined by the resistance value of transistor 125. A trigger pulse from the generator 30 gates SCR 49 ON when its amplitude exceeds the voltage capacitor 53 has discharged to in the interval between pulses.

Timing circuit 100 controls the discharging of capacitor 53 by transistor 125. Transistor 125 is operated in its active region (as a resistor) over a predetermined range of current regardless of engine speed so that its resistance is not substantially a constant value during a portion of its operation. When the resistance of the transistor decreases, and capacitor 53 discharges to a lower level permitting trigger pulses from the generator 30 to pass to SCR 49 at a lower voltage level. This triggers SCR 49 ON earlier in the operating cycle of the engine, hence advancing the timing. The timing circuit 100 receives the computer output current 60, of 4 to 20 milliamperes, and reduces the current to operate the transistor 125 in its active range and provide a 7 degree timing change for that range. Resistor 101 has a resistance value so that the voltage developed from the current will reach the forward voltage drop of the diode 112 at 4 milliamperes. Resistor 103, 105, and 104 have resistances designed to match the gain of the transistor 125 so that the effective resistance of the circuit changes to provide a linear advance as the computer current 60 increases to 20 milliamperes. Resistor 102 and diode 111 are added to change the slope and/or to change the current to the transistor 125 if the gain is not linear. At a predetermined voltage level across resistor 101, diode 111 will conduct, changing the amount of current to the transistor 125.

As the computer current 60 increases, the current to transistor 125 from circuit 100 increases driving transistor 125 further into its active region (lowering its resistance) thereby bypassing more of the current from the trigger pulse generator 39 and further advancing the ignition pulse. Resistors 103, 104 and 105 may be varied to change the slope of the current to transistor 125 and, therefore, change the advance of the timing pulse with speed to fit a desired curve.

The following is the table of values for the components of the timing circuit.

COMPONENT VALUES

Resistor 101—470 ohms
Resistor 102—30K ohms
Resistor 103—1M ohms
Resistor 104—250K ohms
Resistor 105—250K ohms
Diode 111—IN4001
Diode 112—IN4001
Transistor 125—GES 5828

Having described the invention what is claimed is:

1. In combination with a internal combustion engine ignition system having at least one spark plug; means for receiving and storing electrical energy including a first solid state electronic switching device for releasing the stored energy when switched; a triggering circuit for switching the first electronic switching device to release the stored energy through said spark plug, said triggering circuit including a second solid state electronic switching device, pulse generating means for generating a succession of electrical trigger pulses in timed relation to the speed of the engine crankshaft for switching the second switching device which switches the first switching device, and means for biasing the second switching device; and means for automatically controlling the bias means, said control means including a transistor connected in parallel with said biasing means and means for operating said transistor in the active region of its operating characteristics wherein its resistance is not substantially a constant value of resistance, the improvement wherein said transistor operating means comprises:

a resistor and diode network adapted to receive electrical current and provide an output current to the transistor, said network comprising:
  a first resistor having one lead electrically connected to ground and the other lead adapted to receive the electrical current;
  a second resistor electrically connected in series with a first diode and having one lead thereof electrically connected to ground;
  a third resistor and second diode electrically connected together in series and electrically connected between the other leads of the first resistor and the second resistor and first diode;
  a fourth resistor having one lead electrically connected to ground and its other lead electrically connected to the base of the transistor; and
  a fifth resistor connected between the other leads of said first diode and second resistor and said fourth resistor.

2. The ignition system recited in claim 1 wherein the bias means comprises a capacitor.

3. In combination with an internal combustion engine ignition system including at least one spark plug; means for receiving and storing electrical energy including a first solid state electronic switching device; a triggering circuit for switching the first electronic switching device to release the stored energy through said spark plug, said triggering circuit including a second solid state electronic device, electromagnetic pulse generating means for generating a succession of electrical trigger pulses in timed relation to the engine and which increase in amplitude with an increase in engine speed to make the second switching device electronically conductive and switch the first switching device, voltage bias means connected between the pulse generating means and the second switching device to advance, with an increase in speed, the time in the engine cycle the second switching device is made conductive; and means for controlling the voltage of the bias means independently of pulse amplitude to control the time in the engine cycle the second switching device is conductive to control spark timing, the means for controlling the voltage on the bias means including a transistor electrically connected in parallel relationship with said voltage biasing means and means for operating said transistor in the active region of its operating characteristics wherein its circuit resistance is not substantially a constant value of resistance during its operation, the improvement wherein said transistor operating means includes:

a resistor and diode network adapted to receive electrical current and provide an output current to the transistor, said network comprising:
 a first resistor having one lead electrically connected to ground and the other lead adapted to receive the electrical curent;
 a second resistor electrically connected in series with a first diode and having one lead thereof electrically connected to ground;
 a third resistor and second diode electrically connected together in series and electrically connected between the other leads of the first resistor and the second resistor and first diode;
 a fourth resistor having one lead electrically connected to ground and its other lead electrically connected to the base of the transistor; and
 a fifth resistor connected between the other leads of said first diode and second resistor and said fourth resistor.

4. The ignition system recited in claim 3 wherein said biasing means is a capacitor.

5. An ignition system for an internal combustion engine comprising: at least one spark plug; means for receiving and storing electrical energy including a first solid-state electronic switching device; a triggering circuit for switching the first electronic switching device to release the stored energy through said spark plug, said triggering circuit including a second solid-state electronic switching device, electromagnetic pulse generating means for generating a succession of electrical trigger pulses in timed relation to the operating cycle of the engine and which increase in amplitude with an increase in engine speed to make said second switching device electrically conductive and switch said first switching device, and means for preventing a portion of the trigger pulses from going to said second switching device; and means for varying the portion of the trigger pulse going to the second switching device, said means for varying the portion of the pulse going to the second switching device including a transistor connected in parallel with said preventing means, and means for operating said transistor in the active region of its operating characteristics wherein its circuit resistance is not substantially a constant value of resistance during its operation, said transistor operating means comprising:

a resistor and diode network adapted to receive electrical current and provide an output current to the transistor, said network comprising:
 a first resistor having one lead electrically connected to ground and the other lead adapted to receive the electrical curent;
 a second resistor electrically connected in series with a first diode and having one lead thereof electrically connected to ground;
 a third resistor and second diode electrically connected together in series and electrically connected between the other leads of the first resistor and the second resistor and first diode;
 a fourth resistor having one lead electrically connected to ground and its other lead electrically connected to the base of the transistor; and
 a fifth resistor connected between the other leads of said first diode and second resistor and said fourth resistor.

6. A circuit for controlling the output current to an ignition system from a computer analyzing at least one operating parameter of an internal combustion engine, said circuit comprising:

a transistor having its output electrically connected to said ignition system; and
a resistor and diode network adapted to receive the electrical current from said computer and provide an output current to the base of said transistor, said network comprising:
 a first resistor having one lead electrically connected to ground and the other lead adapted to receive the electrical current;
 a second resistor electrically connected in series with a first diode and having one lead thereof electrically connected to ground;
 a third resistor and second diode electrically connected together in series and electrically connected between the other leads of the first resistor and the second resistor and first diode;
 a fourth resistor having one lead electrically connected to ground and its other lead electrically connected to the base of the transistor; and
 a fifth resistor connected between the other leads of said first diode and second resistor and said fourth resistor.

* * * * *